(12) United States Patent
Anderberg et al.

(10) Patent No.: US 12,094,309 B2
(45) Date of Patent: Sep. 17, 2024

(54) EFFICIENT USER INTERFACE NAVIGATION FOR MULTIPLE REAL-TIME STREAMING DEVICES

(71) Applicants: Sony Group Corporation, Tokyo (JP); Sony Pictures Entertainment Inc., Culver City, CA (US)

(72) Inventors: Tobias Anderberg, Los Angeles, CA (US); Scott Metzger, Los Angeles, CA (US)

(73) Assignees: Sony Group Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

(21) Appl. No.: 17/118,348

(22) Filed: Dec. 10, 2020

(65) Prior Publication Data

US 2021/0183222 A1   Jun. 17, 2021

Related U.S. Application Data

(60) Provisional application No. 62/947,703, filed on Dec. 13, 2019.

(51) Int. Cl.
| | | |
|---|---|---|
| *G08B 13/196* | (2006.01) | |
| *H04N 23/62* | (2023.01) | |
| *H04N 23/661* | (2023.01) | |
| *H04N 23/90* | (2023.01) | |

(52) U.S. Cl.
CPC .. *G08B 13/19693* (2013.01); *G08B 13/19645* (2013.01); *G08B 13/19689* (2013.01); *H04N 23/62* (2023.01); *H04N 23/661* (2023.01); *H04N 23/90* (2023.01)

(58) Field of Classification Search
CPC ............... H04N 5/247; H04N 5/23216; G08B 13/19693; G08B 13/19645
See application file for complete search history.

(56) References Cited

U.S. PATENT DOCUMENTS

| | | | | |
|---|---|---|---|---|
| 7,683,940 B2* | 3/2010 | Fleming | ............... | G11B 27/034 348/222.1 |
| 8,467,672 B2* | 6/2013 | Konicek | ............ | H04N 5/23219 396/56 |
| 8,531,522 B2* | 9/2013 | Horovitz | ................ | H04N 7/181 348/143 |
| 9,894,261 B2* | 2/2018 | Flannery | ................ | H04N 5/247 |
| 10,157,526 B2* | 12/2018 | Galvin | ............... | H04N 21/2187 |

(Continued)

*Primary Examiner* — Boubacar Abdou Tchoussou
(74) *Attorney, Agent, or Firm* — Procopio, Cory, Hargreaves & Savitch LLP (57) ABSTRACT

Managing cameras and controlling video display, including: identifying a first group of cameras, each camera in the first group having a respective image stream; identifying a second group of cameras, each camera in the second group having a respective image stream, and each camera in the second group is not in the first group; assigning a name to each group; assigning a name to each camera; displaying the name of each group in a user interface on a computer system; displaying the name of each camera in the user interface; receiving a selection of a group through the user interface; displaying the image stream for each camera in the selected group simultaneously; receiving a selection of one camera through the user interface; and displaying the image stream for the selected camera.

12 Claims, 4 Drawing Sheets

(56) References Cited

U.S. PATENT DOCUMENTS

| | | | |
|---|---|---|---|
| 10,810,863 B2* | 10/2020 | Marlatt | G08B 26/004 |
| 11,183,037 B2* | 11/2021 | Gordon-Carroll | G06F 16/487 |
| 2006/0279628 A1* | 12/2006 | Fleming | H04N 5/76 |
| | | | 348/E7.086 |
| 2009/0295918 A1* | 12/2009 | Horovitz | G06F 3/04817 |
| | | | 348/143 |
| 2010/0002082 A1* | 1/2010 | Buehler | G08B 13/19693 |
| | | | 348/159 |
| 2010/0304731 A1* | 12/2010 | Bratton | H04N 5/23206 |
| | | | 455/420 |
| 2011/0205379 A1* | 8/2011 | Konicek | H04N 5/23219 |
| | | | 348/211.1 |
| 2014/0125808 A1* | 5/2014 | Flannery | H04N 5/247 |
| | | | 348/159 |
| 2014/0211027 A1* | 7/2014 | Worrill | H04N 5/23206 |
| | | | 348/207.11 |
| 2015/0040165 A1 | 2/2015 | Zajac | |
| 2016/0110993 A1* | 4/2016 | Marlatt | G08B 13/19656 |
| | | | 340/4.33 |
| 2016/0232764 A1* | 8/2016 | Galvin | H04N 21/274 |
| 2016/0364123 A1 | 12/2016 | Burns et al. | |
| 2019/0124300 A1 | 4/2019 | Horovitz et al. | |

* cited by examiner

EFFICIENT USER INTERFACE NAVIGATION FOR MULTIPLE REAL-TIME STREAMING DEVICES

CROSS-REFERENCE TO RELATED APPLICATIONS

This application claims the benefit of priority under 35 U.S.C. § 119(e) of U.S. Provisional Patent Application No. 62/947,703, filed Dec. 13, 2019, entitled "Efficient UI Navigation for Multiple Real-Time Streaming Devices." The disclosure of the above-referenced application is incorporated herein by reference.

BACKGROUND

Field

The present disclosure relates to managing image devices, and more specifically, to managing cameras and controlling video display.

Background

In a large image streaming system with hundreds of connected devices (e.g., web cameras, surveillance cameras, machine vision cameras, and other similar image devices), it can be very difficult and time consuming in navigating to and viewing image feeds for a specific device, or even a group of devices.

SUMMARY

The present disclosure provides for managing cameras and controlling video display.

In one implementation, a method for managing cameras and controlling video display is disclosed. The method includes: identifying a first group of cameras, wherein the first group includes two or more cameras and each camera in the first group has a respective image stream; identifying a second group of cameras, wherein the second group including two or more cameras, each camera in the second group has a respective image stream, and each camera in the second group is not in the first group; assigning a name to each group; assigning a name to each camera; displaying the name of each group in a user interface on a computer system; displaying the name of each camera in the user interface; receiving a selection of a group through the user interface; displaying the image stream for each camera in the selected group simultaneously; receiving a selection of one camera through the user interface; and displaying the image stream for the selected camera.

In one implementation, the names of groups and cameras are displayed in a hierarchical tree structure. In one implementation, displaying the image stream for each camera in the selected group simultaneously includes displaying the image streams in a grid layout. In one implementation, receiving a selection of a group through the user interface includes receiving audio data indicating the name of the selected group. In one implementation, the image stream for the selected camera is displayed simultaneously with the image streams for the selected group.

In another implementation, a user interface for receiving selections and displaying image streams of groups of cameras is disclosed. The user interface includes: at least one first image stream of each camera in a selected group displayed simultaneously, wherein the selected group is selected from: (a) a first group of cameras, wherein the first group includes two or more cameras and each camera in the first group has a respective image stream; and (b) a second group of cameras, wherein the second group includes two or more cameras, each camera in the second group has a respective image stream, and each camera in the second group is not in the first group; at least one second image stream of a selected camera; wherein identifiers are assigned to groups and cameras.

In one implementation, the identifiers of groups and cameras are displayed in a hierarchical tree structure. In one implementation, the at least one first image stream of each camera in the selected group is displayed simultaneously in a grid layout. In one implementation, the selected group is selected using audio data indicating the identifier of the selected group. In one implementation, the at least one second image stream of the selected camera is displayed simultaneously with the at least one first image stream of each camera in the selected group.

In another implementation, a non-transitory computer-readable storage medium storing a computer program to manage cameras and control video display is disclosed. The computer program includes executable instructions that cause a computer to: identify a first group of cameras, wherein the first group includes two or more cameras and each camera in the first group has a respective image stream; identify a second group of cameras, wherein the second group including two or more cameras, each camera in the second group has a respective image stream, and each camera in the second group is not in the first group; assign a name to each group; assign a name to each camera; display the name of each group in a user interface on a computer system; display the name of each camera in the user interface; receive a selection of a group through the user interface; display the image stream for each camera in the selected group simultaneously; receive a selection of one camera through the user interface; and display the image stream for the selected camera.

In one implementation, the names of groups and cameras are displayed in a hierarchical tree structure. In one implementation, the executable instructions that cause the computer to display the image stream for each camera in the selected group simultaneously include executable instructions that cause the computer to display the image streams in a grid layout. In one implementation, the executable instructions that cause the computer to receive a selection of a group through the user interface comprise executable instructions that cause the computer to receive audio data indicating the name of the selected group. In one implementation, the image stream for the selected camera is displayed simultaneously with the image streams for the selected group.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, in a large image streaming system with hundreds of connected devices (e.g., web cameras, surveillance cameras, machine vision cameras, and other similar image devices), it can be very difficult and time consuming in navigating to and viewing image feeds for a specific device, or a group of devices. For example, selection of a group of streaming devices or a single streaming device and/or navigation among the streaming devices can be difficult when the selection and/or navigation is performed with a large number of streaming devices.

Certain implementations of the present disclosure provide a technique for managing a large number of streaming devices. In one implementation, a video system provides a user interface that manages real-time image streaming devices. The user interface provides quick workflow, color pipeline, and device setting verification.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in implementations can include, but are not limited to, one or more of the following items: (a) a system of image streaming devices with unique naming convention; (b) a user interface tree view organization of the devices for rapid navigation using keyboard and mouse; and (c) dynamically changing device views based on tree view navigation/selection.

In one implementation, the user interface of the video system assigns a unique name (or identifier) to each device (e.g., identified by its serial number). Thus, the names of the group of devices can define a hierarchical tree structure (or other navigational structures) that allows for automatic grouping of devices and quick navigation between them. In another implementation, the navigation process can be further improved by a keyboard shortcut scheme (such as arrow keys, or any configurable key mapping).

Figure 1A:
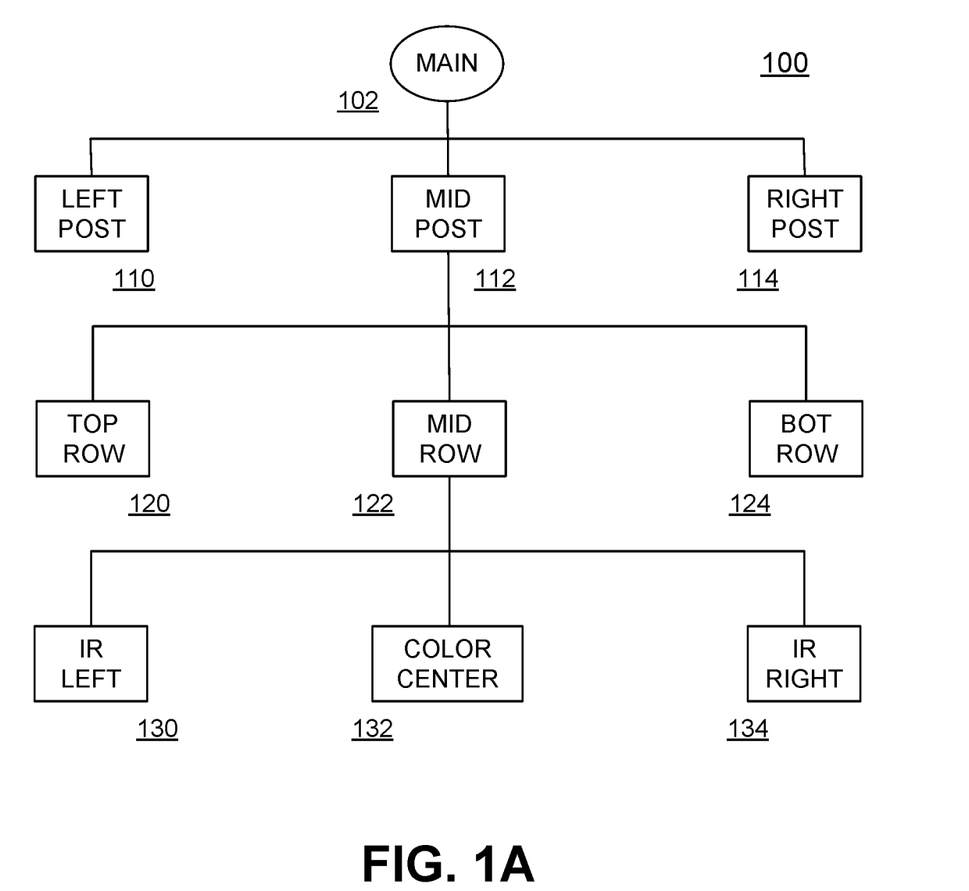
FIG. 1A is an example of a navigational layout with respect to a configuration of camera devices shown in FIG. 1B in accordance with one implementation of the present disclosure.
Figure 1B:
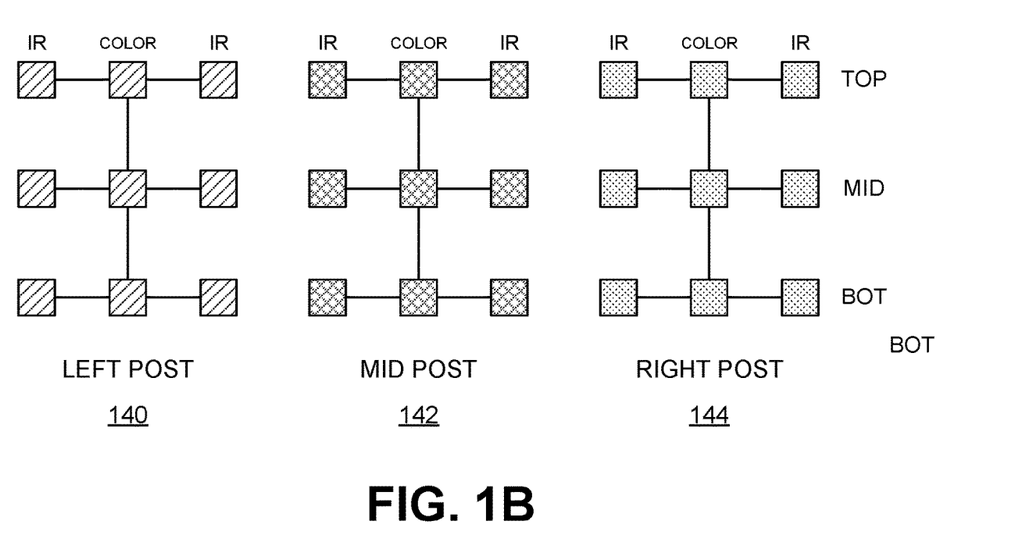
FIG. 1B is an example configuration of camera devices in accordance with one implementation of the present disclosure.

FIG. 1A is an example of a navigational layout 100 with respect to a configuration of camera devices shown in FIG. 1B in accordance with one implementation of the present disclosure. In the illustrated implementation of FIG. 1A, the navigational layout 100 is arranged in a hierarchical tree view with a main node 102 at the top. Thus, the hierarchical tree view may be presented in a user interface.

In the navigational layout 100 of FIG. 1A, each node of the top row represents a post (i.e., left 110, mid 112, right 114); each node of the second row represents a row of the selected post (i.e., top 120, mid 122, bot 124); and each node of the third row represents a camera of the selected row (i.e., top 120, mid 122, bot 124). Thus, in one implementation, selecting the main node 102 selects all 27 camera devices of FIG. 1B. Image streams of the selected camera devices can then be displayed as shown in FIG. 1B.

Figure 1C:
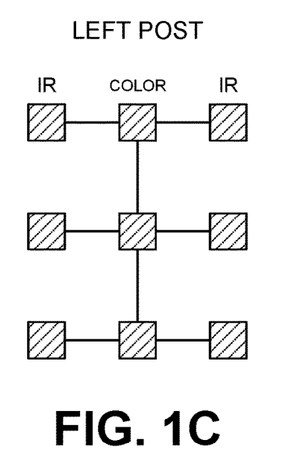
FIGS. 1C, 1D, and 1e illustrate examples of a grid layout in accordance with one implementation of the present disclosure.

In one implementation, selecting a post (e.g., left 110, mid 112, or right 114) from the top row of the navigational layout 100 selects all camera devices in the selected post. For example, selecting a left post 110 on the top row selects all camera devices in the left post 140 shown in FIG. 1B. The image streams of the camera devices in the left post can be displayed in a 3×3 grid layout as shown in FIG. 1C.

Figure 1D:
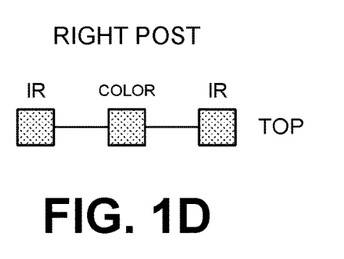

In another implementation, selecting a row (e.g., top 120, mid 122, or bot 124) from the second row of the navigational layout 100 selects camera devices in the selected row of the selected post. For example, selecting a right post 114 from the top row and selecting a top row 120 from the second row of the navigational layout 100 selects all camera devices in the top row of the right post 144 shown in FIG. 1B. The image streams of the camera devices in the top row of the right post can be displayed in a 1×3 grid layout as shown in FIG. 1D.

Figure 1E:
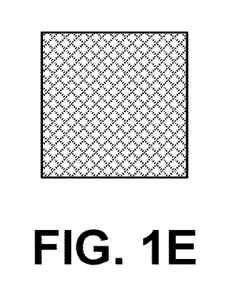

In a further implementation, selecting a node (e.g., IR left 130, color center 132, or IR right 134) from the third row of the navigational layout 100 selects a camera device in the selected node in the selected row of the selected post. For example, selecting a mid-post 112 from the top row, selecting a mid-row 122 from the second row, and selecting a color center node 132 from the third row of the navigational layout 100 selects the color camera device in the middle row of the middle post 142 shown in FIG. 1B. An image stream of the color camera device in the middle row of the middle post can be displayed in a 1×1 grid layout as shown in FIG. 1E.

Figure 2:
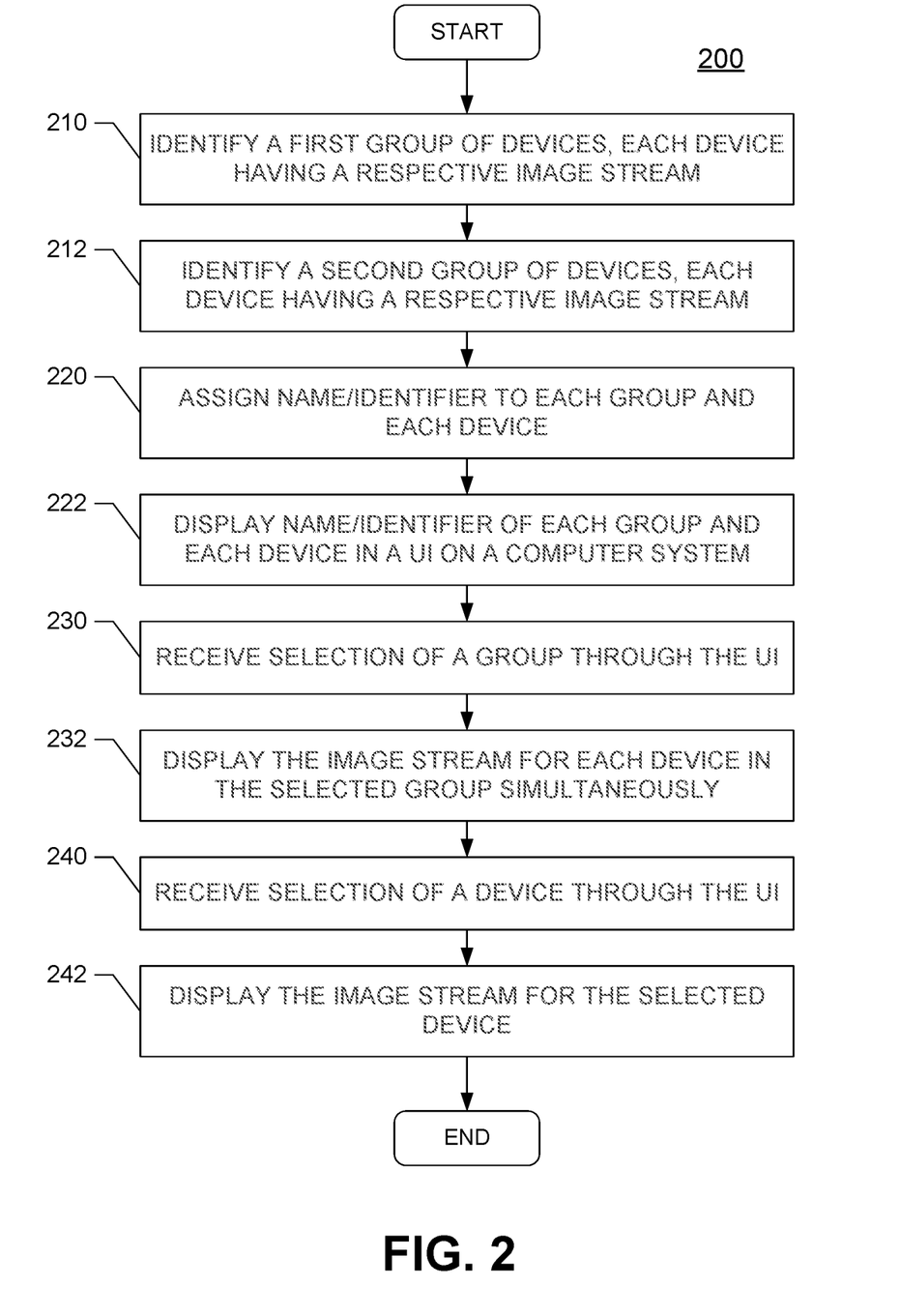
FIG. 2 is a flow diagram of a method for managing devices and controlling video displays in accordance with one implementation of the present disclosure.

FIG. 2 is a flow diagram of a method 200 for managing devices and controlling video displays in accordance with one implementation of the present disclosure. In one implementation, devices include at least one camera or sensor. In the illustrated implementation of FIG. 2, a first group of devices is identified, at block 210, wherein each device in the first group has a respective image stream. A second group of devices is also identified, at block 212, wherein each device in the second group has a respective image stream, and each device in the second group is not in the first group. A name or identifier is then assigned to each group and to each device, at block 220, and the name or identifier of each group and each device is displayed in a user interface on a computer system, at block 222. In one implementation, the names or identifiers of groups and devices are displayed in a hierarchical tree view.

The method 200 also includes receiving a selection of a group through the user interface, at block 230, and displaying the image stream for each device in the selected group simultaneously, at block 232. In one implementation, receiving the selection of a group through the user interface includes receiving audio data indicating the name of the selected group. In one implementation, displaying the image stream for each device in the selected group simultaneously includes displaying the image streams in a grid. The method 200 further includes receiving a selection of one device through the user interface, at block 240, and displaying the image stream for the selected device, at block 242. In one implementation, the image stream for the selected device is displayed simultaneously with the image streams for the selected group.

In one implementation, a video system, which may be managed by the method 200 of FIG. 2, is used in a video production or studio environment for volumetric capture and includes one or more cameras for image capture, one or more sensors, and one or more computers to process the camera and sensor data.

In one implementation, the video system includes a volumetric capture rig that uses a combination of infrared (IR) and color cameras. The hardware cameras are set up for the type of capture needed, such as infra-red (IR), color, IR combination in a 3×3 grid, for example. In the user interface, the system identifies a grouping of cameras, such as 3×3, 3×1, or 1×1. The system assigns a name/identifier to each group, and a name/identifier to each device. The system organizes the groups into a hierarchical structure where each node corresponds to a set or group of cameras. The user interface displays the hierarchical structure, showing the names of the groups and devices. Selecting a node in the user interface selects the device or devices corresponding to the node and causes the image stream for each of the devices to be displayed.

In another implementation, a video system deployed for a large sporting event includes multiple cameras. The system groups related cameras together, such as crowd view, sideline view, goal view, and so on. The system configures a navigation hierarchy based on the grouped cameras. By making selections of groups in the user interface, the system can display and change among a view or image from all of the cameras for the entire event, or a group, or a single device. In one implementation, the system supports voice control to the software. In that example, an operator, such as a producer for the event, can quickly see cameras by name or group without having to use keyboard or mouse, or having other personnel around to manually switch to cameras. Similarly, an editor could easily switch among individual or groups of views in post-production or editing work.

Figure 3A:
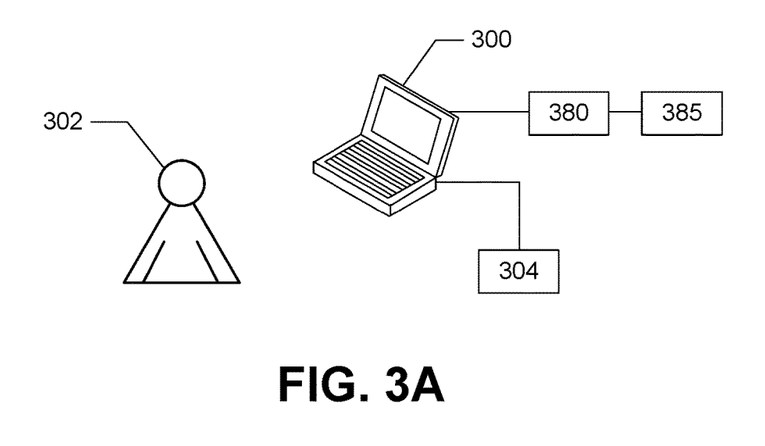
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a video application 390 for implementing a technique for managing and displaying the user interface, and accessing and displaying images and video associated with the devices managed in the user interface as illustrated and described with respect to the navigational and the grid layouts of FIGS. 1A to 1D and the method 200 of FIG. 2.

Figure 3B:
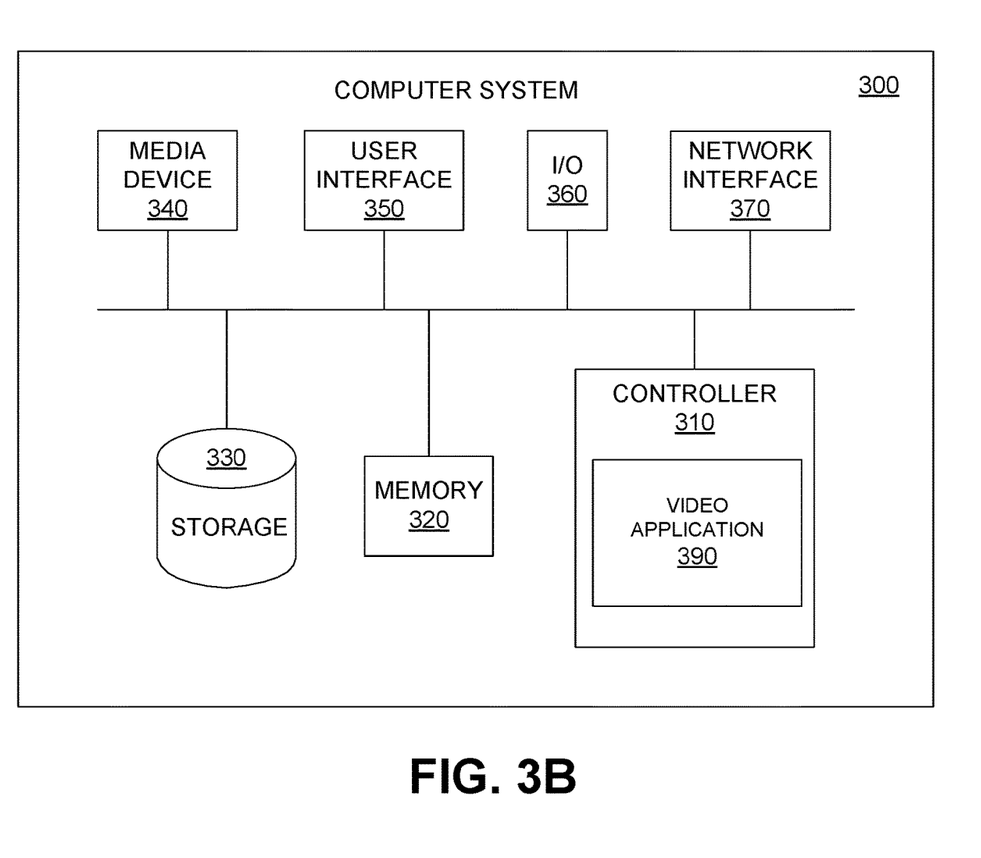
FIG. 3B is a functional block diagram illustrating the computer system hosting the video application in accordance with an implementation of the present disclosure.

The computer system 300 stores and executes the video application 390 of FIG. 3B. In addition, the computer system 300 may be in communication with a software program 304. Software program 304 may include the software code for the video application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the video application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the video application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the video application 390 with a software system, such as to enable identification of groups of cameras and display the image streams for groups and cameras. Alternatively, this service can be implemented as separate hardware components in the controller 310 or the computer system 300. displaying the image stream for each camera in the selected group simultaneously Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the video application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

Additional variations and implementations are also possible. For example, in addition to video production for movies or television, implementations of the system and methods can be applied and adapted for other applications, such as virtual production (e.g., virtual reality environments), volumetric capture applications, networked surveillance systems, or large multi-camera installations (e.g., sporting events or venues).

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method comprising:
    managing a large number of streaming devices including cameras and video displays comprising:
    identifying a first group of cameras, wherein the first group includes two or more cameras and each camera in the first group has a respective image stream;
    identifying a second group of cameras, wherein the second group including two or more cameras, each camera in the second group has a respective image stream, and each camera in the second group is not in the first group;
    assigning a unique name to each group;
    assigning a unique name to each camera;
    displaying in a hierarchical tree view the unique name of each group in a user interface on a computer system,
    wherein the unique name of each group identifies a group position of each group in the hierarchical tree view including at least one of vertical position and horizontal position of each group;
    displaying in the hierarchical tree view the unique name of each camera in the user interface such that a user can determine which cameras are in which areas and select and manage image streams of the selected cameras,
    wherein the unique name of each camera identifies a camera position of each camera in the hierarchical tree view including at least one of vertical position, horizontal position, and type of each camera within a group, the type including infrared (IR) or color,
    wherein displaying unique group names, displaying unique camera names, and types of the cameras within each group arranged in the hierarchical tree view provides views of the camera position and the group position to enable navigation and selection among groups and cameras quicker than with groups arranged in views other than in the hierarchical tree view;
    receiving a selection of a group through the user interface;
    displaying the image stream for each camera in the selected group simultaneously;
    receiving a selection of one camera through the user interface; and
    displaying the image stream for the selected camera.

2. The method of claim 1, wherein displaying the image stream for each camera in the selected group simultaneously includes displaying the image streams in a grid layout.

3. The method of claim 1, wherein receiving a selection of a group through the user interface includes receiving audio data indicating the name of the selected group.

4. The method of claim 1, wherein the image stream for the selected camera is displayed simultaneously with the image streams for the selected group.

5. A user interface for receiving selections and displaying image streams of groups of cameras, comprising:
    at least one first image stream of each camera in a selected group displayed simultaneously, wherein the selected group is selected from: (a) a first group of cameras, wherein the first group includes two or more cameras and each camera in the first group has a respective image stream; and (b) a second group of cameras, wherein the second group includes two or more cameras, each camera in the second group has a respective image stream, and each camera in the second group is not in the first group;
    at least one second image stream of a selected camera;
    wherein unique identifiers are assigned to groups and cameras,
    wherein a unique identifier assigned to each group identifies a group position of each group in a hierarchical tree view including at least one of vertical position and horizontal position of each group,
    wherein a unique identifier assigned to each camera identifies a camera position of each camera in the hierarchical tree view including at least one of vertical position, horizontal position, and type of each camera within a group, the type including infrared (IR) or color,
    wherein the unique identifiers assigned to groups and cameras and types of the cameras are displayed in the hierarchical tree view to enable navigation and selection among groups and cameras quicker than with groups arranged in views other than in the hierarchical tree view,
    wherein the unique identifier assigned to the cameras are displayed in the hierarchical tree view such that a user can determine which cameras are in which areas and select and manage the image streams of the selected cameras,
    wherein the unique identifiers groups identify positions in the hierarchical tree view.

6. The user interface of claim 5, wherein the at least one first image stream of each camera in the selected group is displayed simultaneously in a grid layout.

7. The user interface of claim 5, wherein the selected group is selected using audio data indicating the identifier of the selected group.

8. The user interface of claim 5, wherein the at least one second image stream of the selected camera is displayed simultaneously with the at least one first image stream of each camera in the selected group.

9. A non-transitory computer-readable storage medium storing a computer program comprising executable instructions that cause a computer to:
    manage a large number of streaming devices including cameras and video displays, the computer program comprising executable instructions that cause the computer to:
    identify a first group of cameras, wherein the first group includes two or more cameras and each camera in the first group has a respective image stream;
    identify a second group of cameras, wherein the second group including two or more cameras, each camera in the second group has a respective image stream, and each camera in the second group is not in the first group;
    assign a unique name to each group;
    assign a unique name to each camera;
    display in a hierarchical tree view the unique name of each group in a user interface on a computer system, wherein the unique name of each group identifies a group position of each group in the hierarchical tree view including at least one of vertical position and horizontal position of each group;

display in the hierarchical tree view the unique name of each camera in the user interface such that a user can determine which cameras are in which areas and select and manage image streams of the selected cameras, wherein the unique name of each camera identifies a camera position of each camera in the hierarchical tree view including at least one of vertical position, horizontal position, and type of each camera within a group, the type including infrared (IR) or color, wherein displaying unique group names, unique camera names, and types of the cameras within each group arranged in a hierarchical tree view provides views of the camera position and the group position to enable navigation and selection among groups and cameras quicker than with groups arranged in views other than in the hierarchical tree view;

receive a selection of a group through the user interface;
display the image stream for each camera in the selected group simultaneously;
receive a selection of one camera through the user interface; and
display the image stream for the selected camera.

10. The non-transitory computer-readable storage medium of claim 9, wherein the executable instructions that cause the computer to display the image stream for each camera in the selected group simultaneously comprise executable instructions that cause the computer to display the image streams in a grid layout.

11. The non-transitory computer-readable storage medium of claim 9, wherein the executable instructions that cause the computer to receive a selection of a group through the user interface comprise executable instructions that cause the computer to receive audio data indicating the name of the selected group.

12. The non-transitory computer-readable storage medium of claim 9, wherein the image stream for the selected camera is displayed simultaneously with the image streams for the selected group.

* * * * *